March 12, 1963 R. F. WIGGINS ETAL 3,080,957
MECHANISM FOR INVERTING COATED ARTICLES
Filed Aug. 2, 1960 8 Sheets-Sheet 1

INVENTORS
RICHARD F. WIGGINS
FREDERICK E. ULLMAN

BY
ATTORNEY

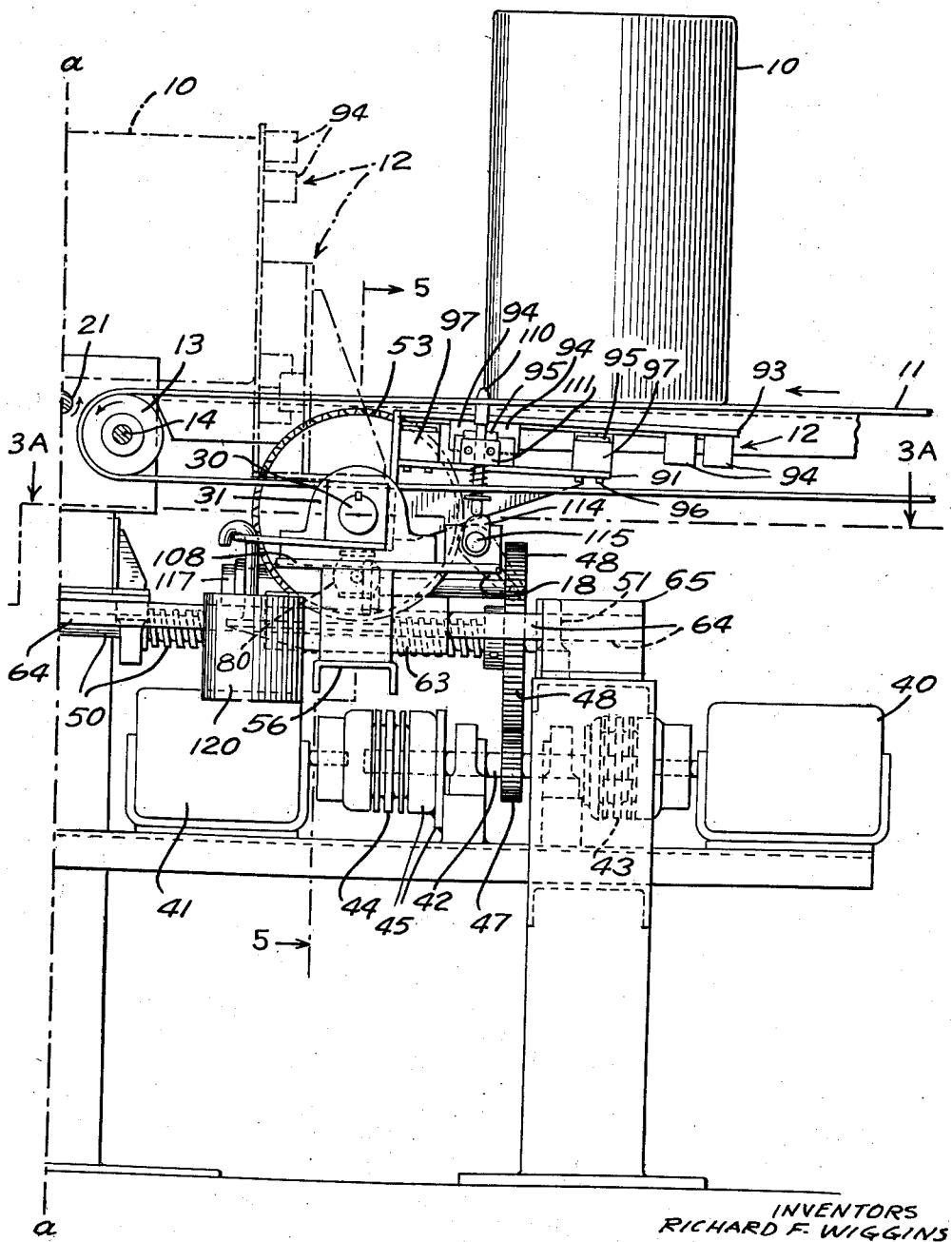

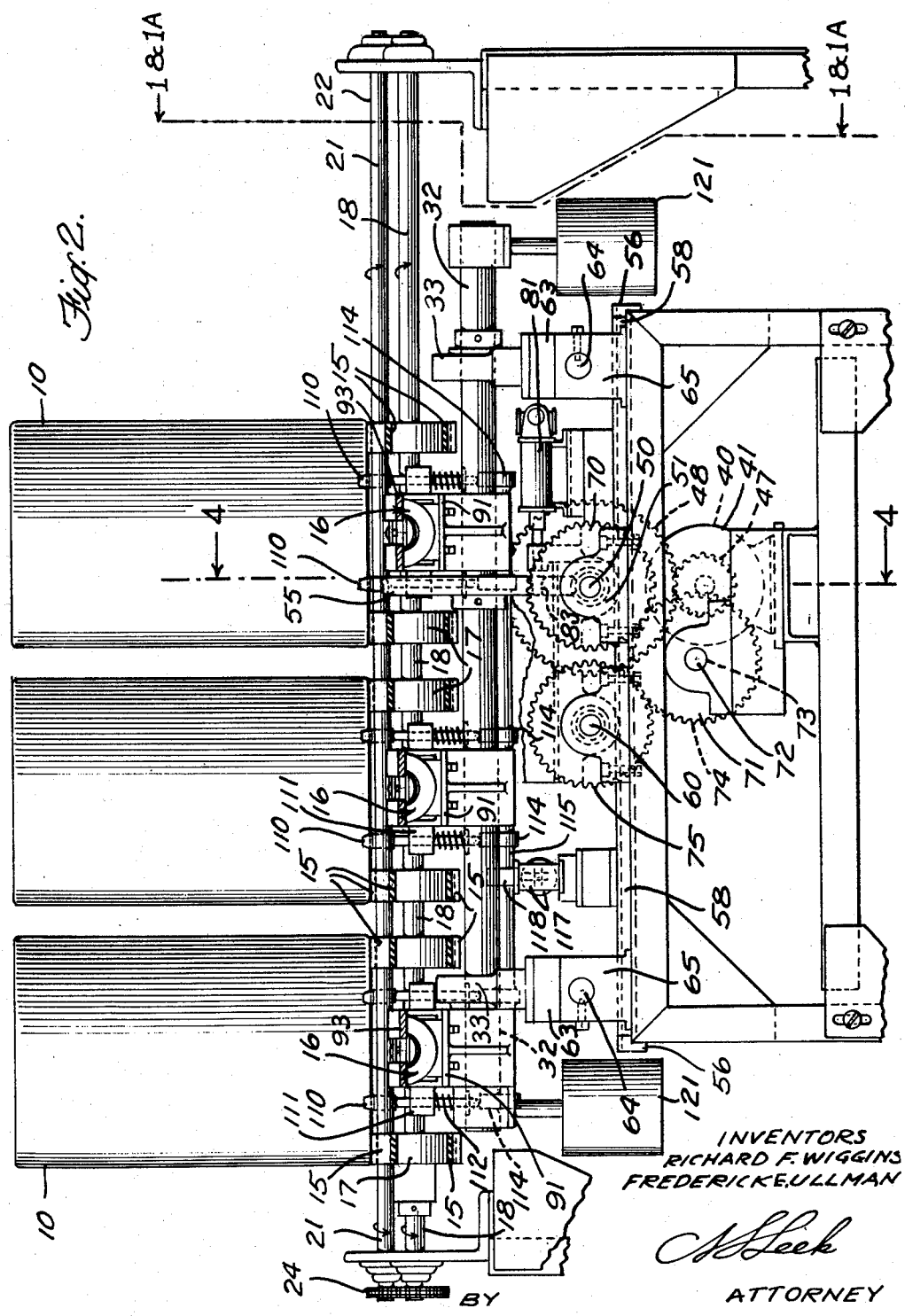

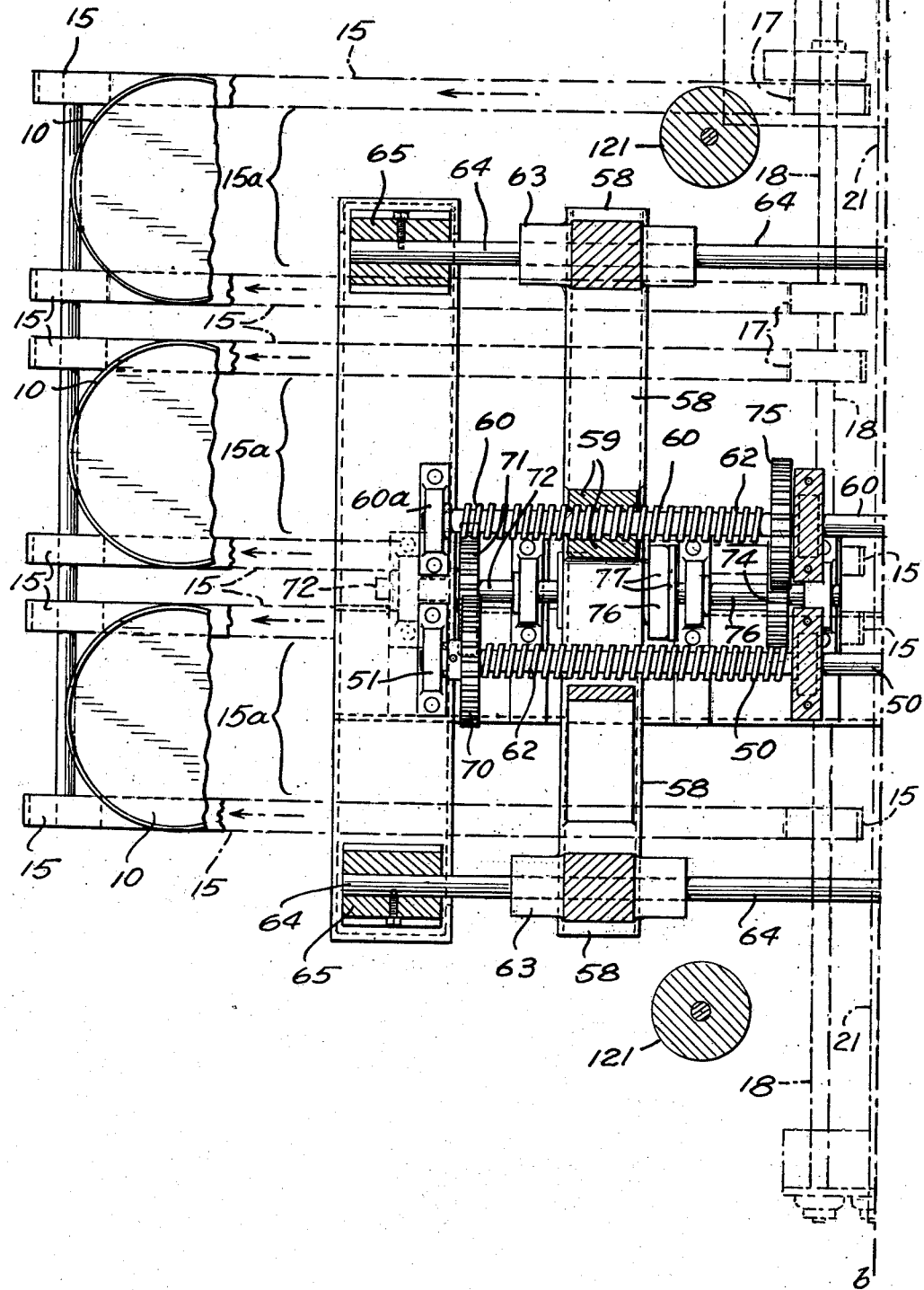

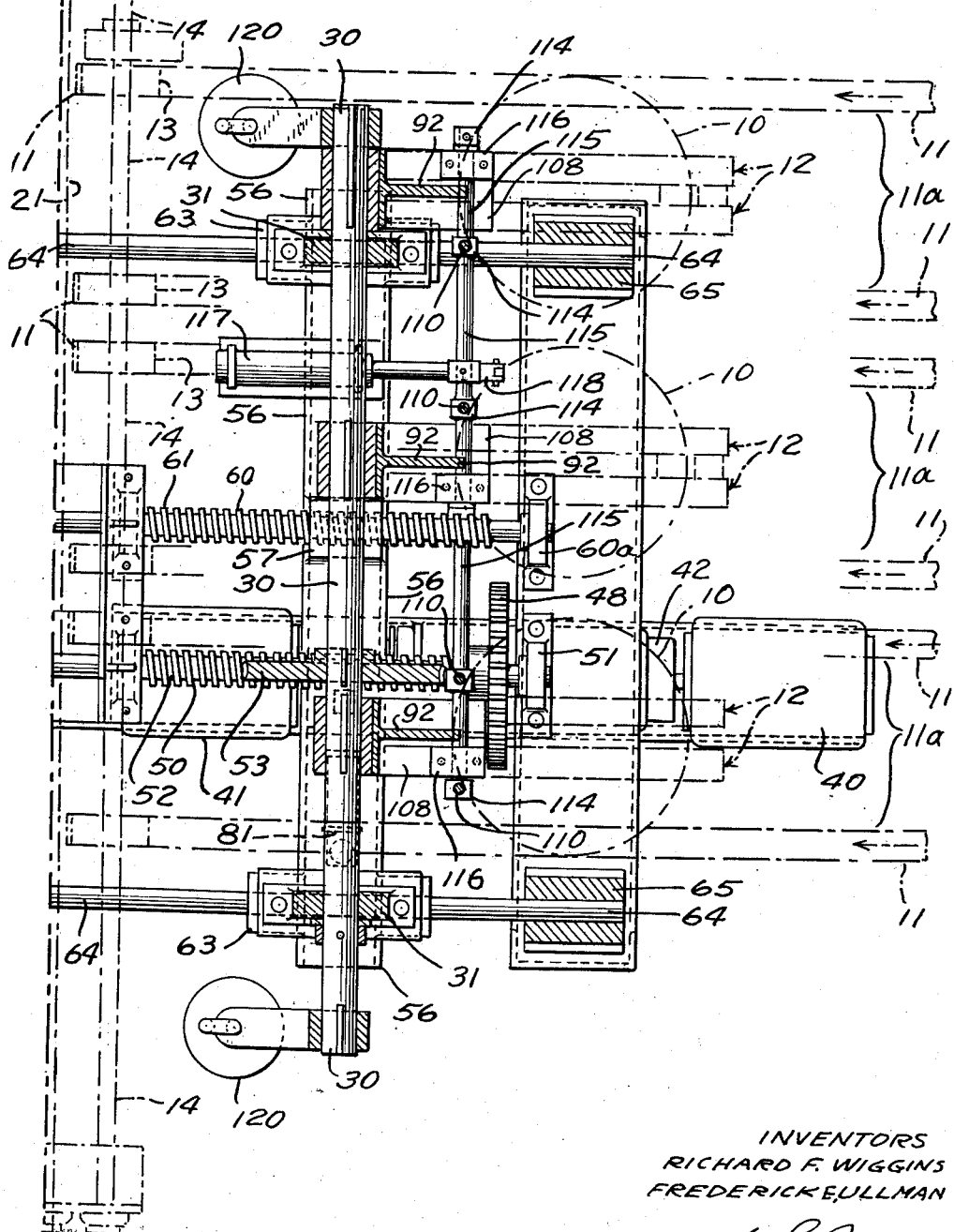

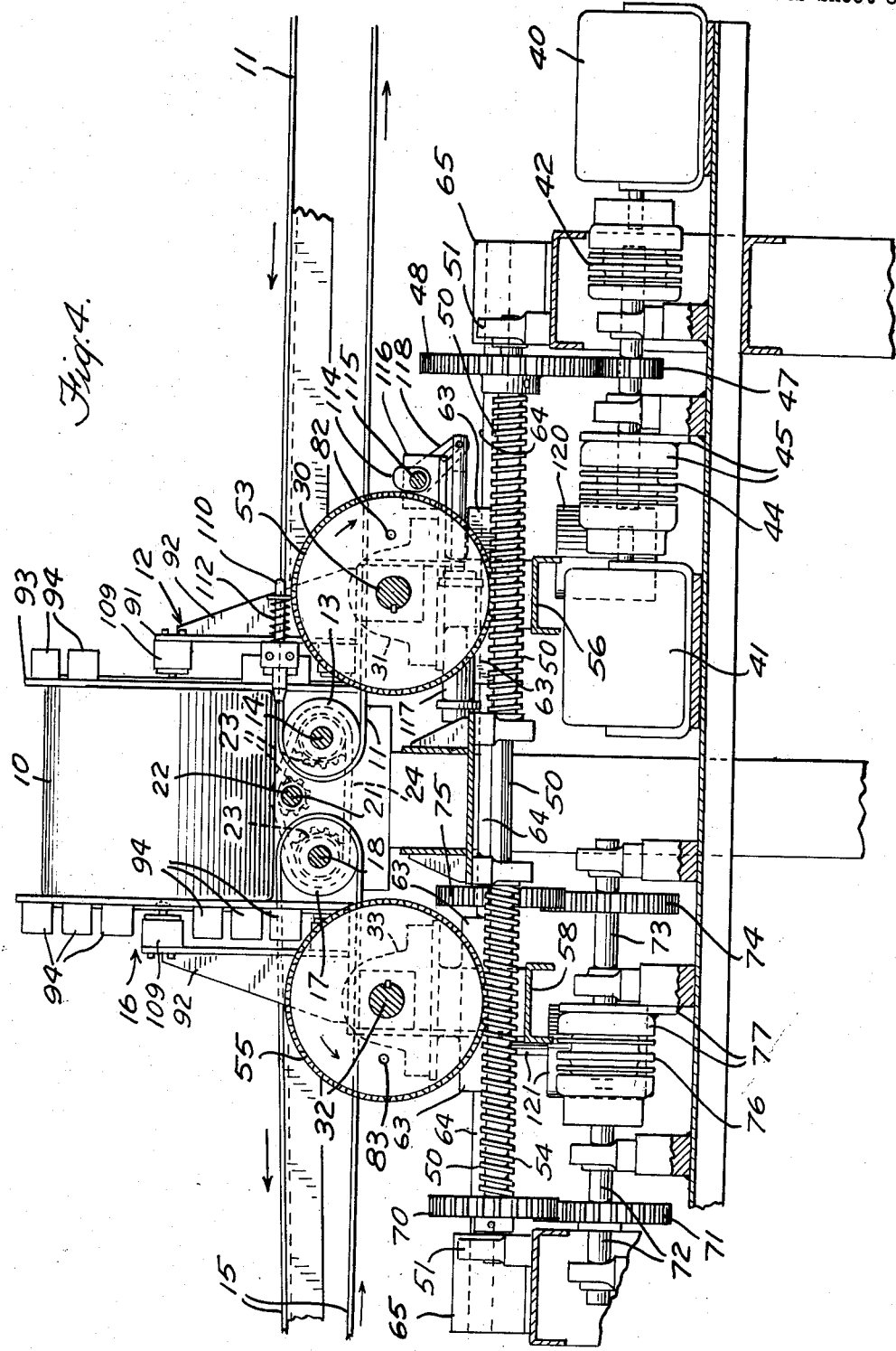

March 12, 1963 R. F. WIGGINS ETAL 3,080,957
MECHANISM FOR INVERTING COATED ARTICLES
Filed Aug. 2, 1960 8 Sheets-Sheet 8
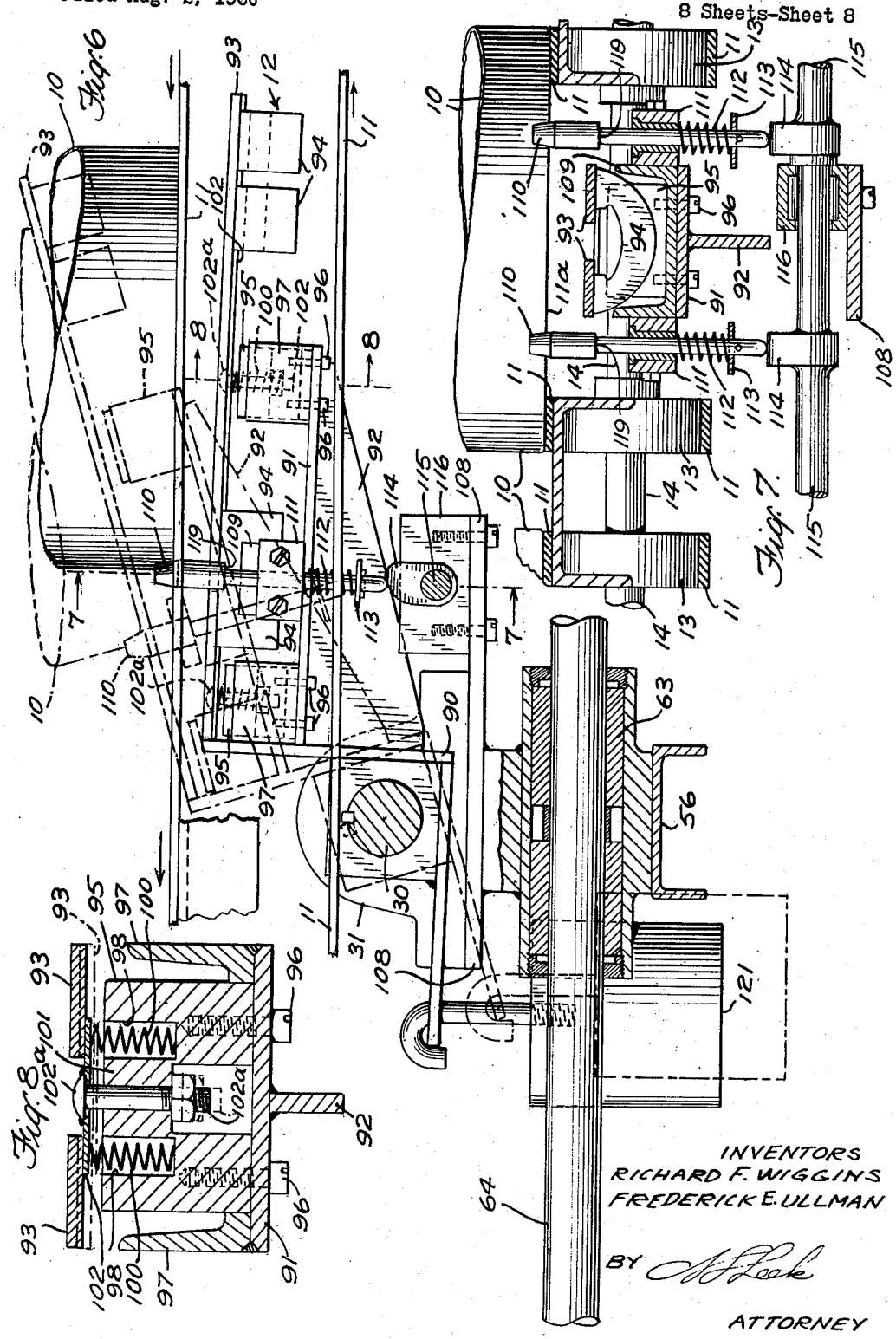
INVENTORS
RICHARD F. WIGGINS
FREDERICK E. ULLMAN
BY
ATTORNEY

United States Patent Office 3,080,957
Patented Mar. 12, 1963

3,080,957
MECHANISM FOR INVERTING COATED ARTICLES
Richard F. Wiggins, Southport, Conn., and Frederick E. Ullman, Winnetka, Ill. (both % The Gyromat Corporation, Box 600, Fairfield, Conn.)
Filed Aug. 2, 1960, Ser. No. 47,048
5 Claims. (Cl. 198—33)

The invention relates to a machine for turning over articles while in transit and although it has a wide range of utility, it is particularly adaptable for turning over containers, such as pails or cans, while they are being moved by a conveyor.

The present invention is disclosed for the purpose of illustration in connection with a system of operating upon containers, in which a succession of containers are coated or sprayed with a paint or other protective material on the inside, are subjected to drying action, are sprayed or coated externally while supported in inverted position with their rims or lips on the bottom, and are conveyed towards an oven while in this inverted position to dry the external coatings. The softening action of the drying oven on the rims of the containers resting on the conveyor, especially where the coatings have a thermoplastic base, may have a marring action on these rims, and since the rims are usually conspicuous parts of the containers, it is desirable to free these rims from contact with any marring surface during this drying operation.

One object of the present invention is to provide a new and improved machine for turning over articles automatically, cyclically and successively as they are conveyed continuously.

In carrying out this object of the present invention, as for example, in connection with containers, these containers while being moved by conveyor means are turned over from one position to another. More specifically, the containers moving in inverted position with their rims resting on the conveyor are turned over into upright position with their rims on top.

Another object of the present invention is to provide in connection with a turnover machine new and improved means for adjusting the machine to accommodate articles of different heights.

A further object is to provide a new and improved turnover machine which is adapted to operate automatically through successive cycles on rows of the articles.

Various other objects and features of the invention are apparent from the following description and from the accompanying drawings, in which FIG. 1 is the side sectional elevation of the delivery end of the turnover machine embodying the present invention and is taken on lines 1—1 of FIG. 2, the machine being shown in full lines at the start of the turnover cycle;

FIG. 2 is a vertical section of the turnover machine taken through the delivery end of the machine on lines 2—2 of FIG. 1;

FIG. 3 is a plan sectional view of the delivery end of the turnover machine taken on lines 3—3 of FIG. 1;

FIG. 3A is a plan sectional view of the feed end of the turnover machine taken on lines 3A—3A of FIG. 1, this FIG. 3A being adapted to be joined to FIG. 3 along the line of juncture b—b;

FIG. 4 is a vertical view of the turnover machine taken on lines 4—4 of FIG. 2 but showing the machine adjusted to handle articles of lesser height and shows the machine in an intermediate turnover stage;

FIG. 6 is an enlarged detail section through one of the magnet arms and through a cam-controlled stop device forming part of the turnover machine;

FIG. 7 is a vertical section of the turnover machine taken on lines 7—7 of FIG. 6;

FIG. 8 is a vertical section of the turnover machine taken on lines 8—8 of FIG. 6.

Figure 1:
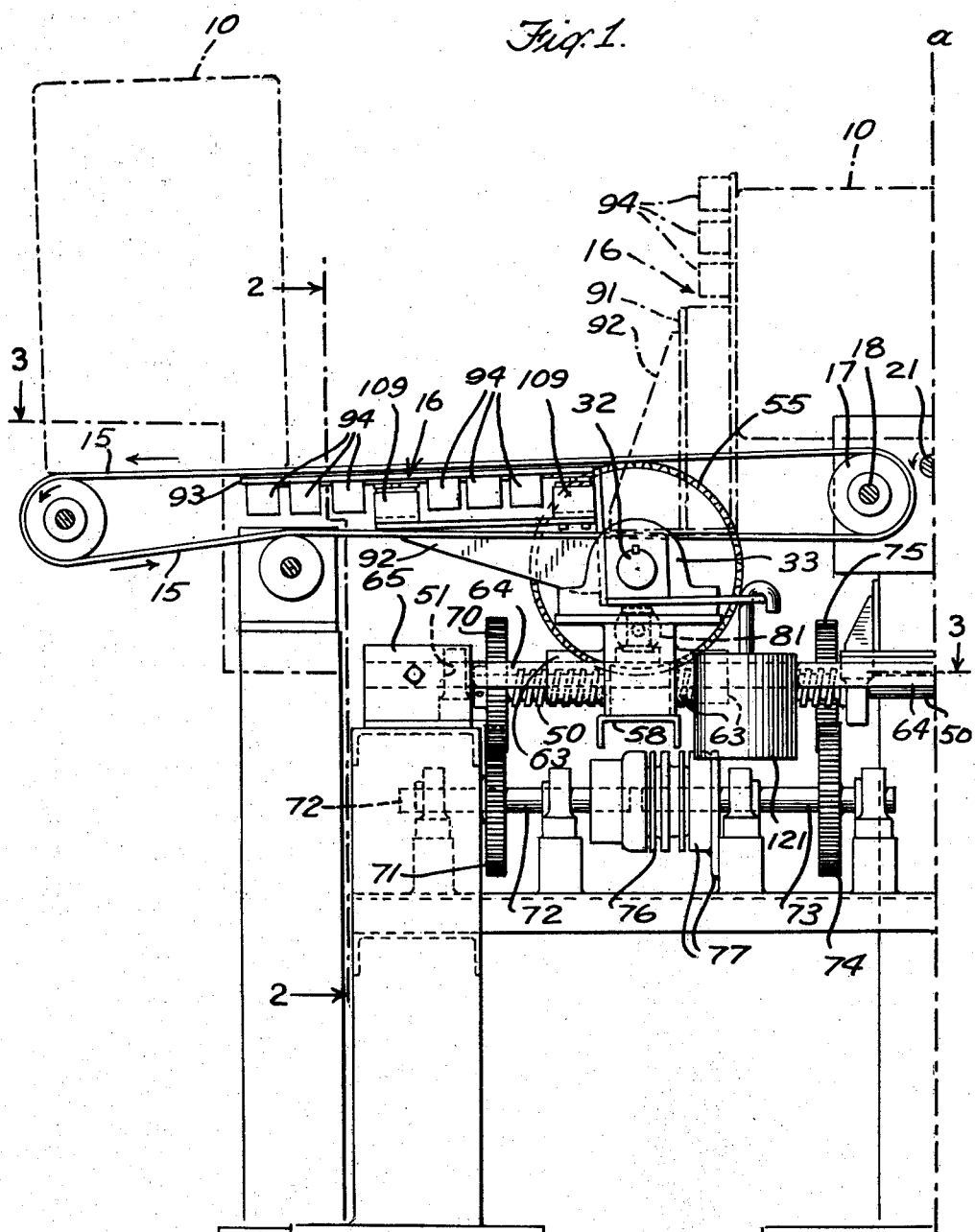
FIG. 1A is the side sectional elevation of the feed end of the turnover machine embodying the present invention and is taken on line 1A—1A of FIG. 2, this FIG. 1A being adapted to be joined to FIG. 1 along the line of juncture a—a to form a continuous view therewith.
Figure 5:
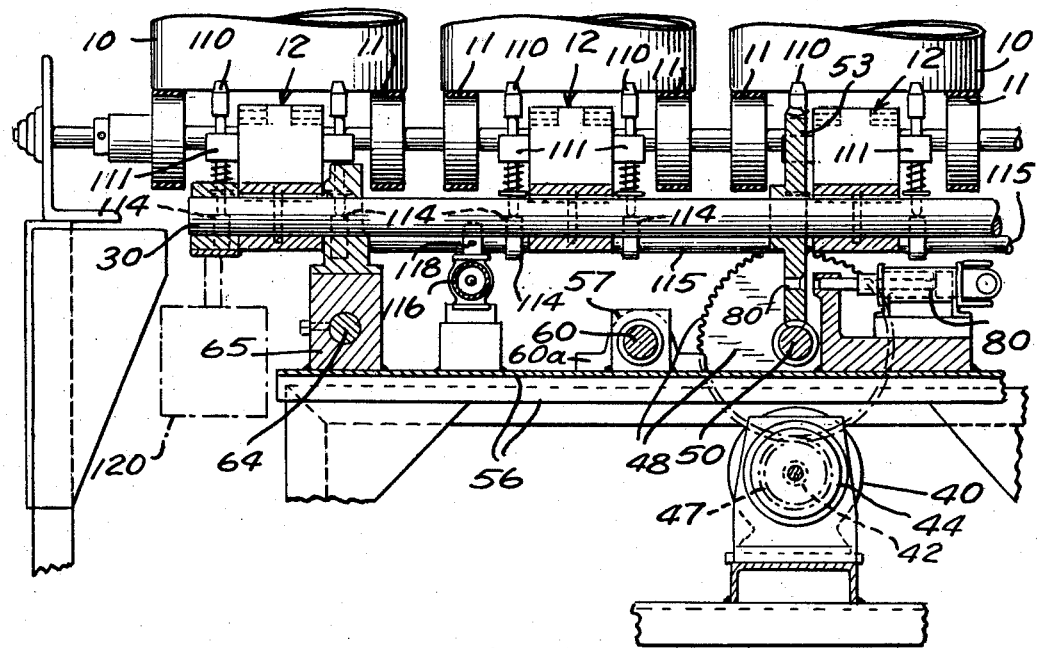
FIG. 5 is a vertical section of the turnover machine taken on lines 5—5 of FIG. 1A.

Referring to FIGS. 1-5 of the drawings, there is provided a conveyor system for carrying successive rows of aligned articles to be turned over. The articles are of magnetizable metal, such as ferrous metal and are shown in the form of cylindrical pails, cans or containers 10, for example, of the five gallon size. These containers 10 are shown for purposes of illustration conveyed in rows of three, but the number of cans in each row may amount to any number. As each row of containers 10 moves into the field of operation of a turnover device, the aligned containers in each row are turned over in unison so that they retain their alignment as they proceed beyond the turnover station.

The containers 10, for example, may have undergone a series of previous operations requiring them to be turned over at the stage we are here concerned with. The containers, for example, may have been previously internally coated with a paint or other protective composition having a thermoplastic base, such as polyethylene, may have been externally coated with a paint or other protective composition, and may have been previously conveyed in single file succession after these operations. The containers 10 are then transferred to the conveyor system of the present invention by a transfer beam (not shown) to form the successive rows of aligned containers on this conveyor system.

The containers 10 as they move into the field of operation of the turnover device are in inverted position with their lip or rim ends on the bottom, and the turnover device turns these containers so that they will stand up on their bottom ends. In this upright position, the containers 10 may be moved through a drying oven (not shown) without marring the rims or lips of the containers.

The conveyor system of the present invention comprises a series of feed belts 11 arranged in pairs depending in number on the number of containers 10 in each row, each pair of conveyor belts being adapted to support a respective container in each row, the conveyor belt of each pair being separated by a space 11a to permit therebetween the operation of a corresponding magnet turnover arm 12 to be more fully described.

The feed belts 11 travel over pulleys including end pulleys 13 secured to a common shaft 14, and may be driven in unison from the other end by suitable drive means (not shown).

The conveyor system also comprises a series of delivery belts 15 also arranged in pairs depending in number on the number of containers in each row, each pair of conveyor belts being adapted to support a respective container in each row, the conveyors of each pair being separated by a space 15a to permit the operation therebetween of a corresponding magnet turnover arm 16 to be more fully described. These delivery conveyor belts 15 are in vertical plane alignment with the feed conveyor belts 11 respectively.

For driving the delivery belts 15 in unison, the belts pass over pulleys including end pulleys 17 adjacent to but spaced from the end pulleys 13 of the feed belts 11, and secured to a common shaft 18.

Between the two series of belts 11 and 15 is a transition pulley 21 on the same supporting level as said belts to permit the containers 10 to be transferred from the belts 11 to the belts 15 smoothly over the transition pulley, in case it is desired not to operate the turnover device. For driving this transition pulley 21 in the proper direction for this purpose and to drive at the same time the delivery belts 15, the pulley shafts 14 and 18 and the shaft 22 of the transition pulley have sprockets 23 secured thereto and driven in the same direction by a chain 24 trained over said sprockets.

For turning over the containers 10 as they reach the turnover station in the transition region of the conveyor belts 11 and 15, there are provided the two sets of magnet arms 12 and 16. The magnet arms 12 of one set are secured to a common rocker shaft 30 journalled in the bearings 31 to cause said arms to be moved by said shaft in unison counterclockwise (FIG. 1A). The magnet arms 12 are moved by the rocker shaft 30 from an inoperative substantially horizontal position below the upper supporting runs of the feed belts 11 at the beginning of the turnover cycle, as shown in full lines in FIG. 1A, to a vertical position shown in dot and dash lines in FIG. 1A and shown in full lines in FIG. 4 and back again to a substantially horizontal position at the end of a complete turnover cycle.

The magnet arms 16 of the other set are secured to a common rocker shaft 32 journalled in bearings 33 to cause said arms to be moved by said shaft in unison clockwise (FIG. 1). The magnet arms 16 are moved by the rocker shaft 32 from an inoperative substantially horizontal position below the upper supporting runs of the delivery belts 15 at the beginning of the turnover cycle, as shown in full lines in FIG. 1, to a vertical position shown in dot and dash lines in FIG. 1 and in full lines in FIG. 4 and back again to a substantially horizontal position at the end of a complete turnover cycle.

The upper runs of the feed belts 11 are shown horizontal, while the upper runs of the delivery belts 15 are shown inclined slightly downwardly in their direction of travel. The container contacting surfaces of the magnet arms 12 are shown in FIG. 1A in inoperative position at the beginning of the turnover cycle, inclined slightly downwardly in directions opposite to the directions of movement of the upper runs of the feed belts 11 to an extent equal to the angle of slope of the upper runs of the delivery belts 15, and the container contacting surfaces of the magnet arms 16 are shown in FIG. 1 in inoperative position at the beginning of the turnover cycle parallel to the upper runs of the delivery belts 15. The container contacting surfaces of the magnet arms 12 and 16 will, therefore, be inclined in opposite directions to the same extent and at the end of their upward angular movements after travelling at the same speed and synchronously in opposite directions, will reach at the same time vertical parallel positions in engagement with the opposite ends of the containers 10, as shown in dot and dash lines in FIGS. 1 and 1A and in full lines in FIG. 4.

In the operation of the turnover device, when a row of containers 10 on the feed belts 11 in upside down position reach a predetermined position directly above the magnet arms 12, the turnover cycle is initiated, causing said arms to swing counterclockwise (FIG. 1A) into engagement with the lower ends of the inverted containers respectively, which in the specific example illustrated are the rims at the open ends of the containers. The magnet arms 12 hold on to the ends of the containers 10 by magnet power and turn them partially on their sides into substantially horizontal position, as said arms swing into vertical position. At the same time, the magnet arms 16 swing clockwise (FIG. 1) and reach vertical position into engagement with the other ends of the containers 10, which in the specific example illustrated, are the closed ends of the containers. The magnet arms 16 in vertical position attract the containers 10 at one end with greater magnetic power than do the magnet arms 12 at the other ends, because of the greater metal presented by the closed bottom of the containers 10 to the magnet arms 16 and because of the fact that the magnet arms 16 are built with greater magnetic power.

As the magnet arms 12 and 16 return towards their inoperative substantially horizontal positions, the magnet arms 16 attracting the containers 10 with greater power than the magnet arms 12 draw and carry the containers with them away from the magnet arms 12 and tilt them into upright position upon the delivery belts 15 and then as magnet arms 16 approach substantially horizontal position, said arms move below said delivery belts and draw away from the lower bottom ends of the containers, leaving the containers still in row alignment but in upright position, to be conveyed by said delivery belts towards a drying oven (not shown).

For cyclically operating the rocker shafts 30 and 32 in unison but in opposite directions, there is provided a pair of motors 40 and 41 (FIGS. 1–5) rotatable in opposite directions, the motor 40 being adapted to drive the rocker shafts in directions to raise the magnet arms 12 and 16 from substantially horizontal positions to substantially vertical positions and the motor 41 being adapted to drive the rocker shafts in directions to lower the magnet arms 12 and 16 from substantially vertical positions back to substantially horizontal positions. The motor 40 for raising the magnet arms 12 and 16 desirably operates at a slower speed than the motor 41, since the series of magnet arms 12 when rising are loaded with the containers 10 and since these magnet arms 12 are necessarily weaker magnetically than the series of magnet arms 16 to permit transfer of the containers 10 from one series to the other. For example, the motor 40 may be driven at half the r.p.m. of the motor 41.

Between the two motors 40 and 41 is a jackshaft 42 in the drive transmission to the rocker shafts 30 and 32, between the shaft of the motor 40 and the jackshaft is an engageable and disengageable electro-magnetically controlled clutch 43, between the motor 41 and the jackshaft is an engageable and disengageable electro-magnetically controlled clutch 44, and between the jackshaft and the frame structure of the machine is an engageable and disengageable electro-magnetically controlled brake 45. In operation, the two motors 40 and 41 are rotating continuously but in opposite directions, and at the proper time at the start of a cycle, while the brake arms 12 and 16 are substantially horizontal, a limit switch (not shown) operating in connection with a transfer beam (not shown) for transferring the containers from a conveyor in a single file to the feed belts 11 in aligned rows, causes the clutch 43 to be energized and engaged, thereby causing the jackshaft 42 to be driven by the motor 40 in the direction of said motor 40. At this phase of the cycle, the clutch 44 is disengaged, so that the motor 41 is operating idly and the brake 45 is disengaged. When the magnet arms 12 and 16 have reached the end of their upward swing and it is time to return the arms back towards substantially horizontal position, a limit switch (not shown) causes the clutch 43 to be deenergized and thereby disengaged and the brake 45 to be energized and thereby applied at the same time or immediately thereafter, to stop the jackshaft 42 and prevent it from overrunning. Immediately after the application of the brake 45, the brake is automatically disengaged and the clutch 44 is automatically engaged causing the jackshaft 42 to be driven from the motor 41. The clutch 44 and the brake 45 may be a clutch-brake coupling of the Warner type. The inertias inherent in the movable parts of the machine however, may be made such, that the brake 45 may be dispensed with, without causing overrun.

The transmission between the jackshaft 42 and the rocker shafts 30 and 32 comprises a pinion 47 affixed to the jackshaft and meshing with a spur gear 48 secured to a drive worm 50 journalled in fixed bearings 51. This worm 50 has a right-hand screw section 52 meshing with a worm wheel 53 secured to the rocker shaft 30 to drive said shaft and a left-hand screw section 54 meshing with a worm wheel 55 secured to the rocker shaft 32 to drive said rocker shaft 32. The rotation of the worm 50 thereby drives the rocker shafts, 30 and 32, in opposite directions, and these directions are reversed when the drive is shifted during the cycle from the motor 40 to the motor 41, through the operation of the limit switches described and the resulting energization and/or deenergization of the clutches 43 and 44.

The rocker shafts 30 and 32 can be adjustably moved to move the two series of magnet arms 12 and 16 towards or away from each other to accommodate containers 10 of different heights. For that purpose, the bearings 31 for the rocker shaft 30 are secured to a movable beam 56 to which is secured a nut 57, and the bearings 33 for the rocker shaft 32 are secured to the opposite ends of a movable beam 58 to which is secured a nut 59. Threaded into the nuts 57 and 59 is an adjusting worm 60 parallel to and similar to the transmission worm 50 and similarly including a right-handed screw section 61 threaded into the nut 57 and a left-handed screw section 62 threaded into the nut 59. The ends of the adjusting worm 60 are supported in respective fixed bearings 60a respectively.

The beams 56 and 58 have collars 63 rigidly secured to the ends thereof and embracing rails 64 with snug slide fits for support and guidance thereby during adjustments, these rails in turn being rigidly secured to fixed end supports 65 secured to the frame structure of the machine. The rotation of the adjusting worm 60 causes the beams 56 and 58 to move laterally, and the rocker shafts 30 and 32 to move correspondingly.

To lock the adjusting worm 60 against rotation during normal turnover operations, so that the axes of the rocker shafts 30 and 32 remain fixed during these operations, and to release the worm for adjusting operation when desired, the drive worm 50 has secured thereto a gear 70 meshing with a gear 71 secured to a shaft 72. In axial alignment with the shaft 72 is a shaft 73 to which is affixed a gear 74 meshing with a gear 75 secured to the adjusting worm 60. An electro-magnetically controlled clutch 76 on the shaft 73 is operable selectively to couple the shaft 73 to the shaft 72 to drive said shaft 73 and in turn the adjusting worm 60 or to couple said shaft 73 to a fixed brake 77 secured to the frame structure of the machine and to lock thereby the adjusting worm against rotation. The clutch 76 and brake 77 may be a clutch-brake coupling of the Warner type.

During normal turnover operations, the clutch 76 is disengaged from the shaft 72 to cause the shaft 72 to rotate idly and the brake 77 is engaged to lock the shaft 73 and thereby the adjustment worm 60 against rotation. When adjustments in the positions of the rocker shafts 30 and 32 are desired, the brake 77 is disengaged and the clutch 76 is engaged to couple the shafts 72 and 73 together, causing the adjusting worm 60 to be rotated from either the motor 40 or the motor 41, through the drive worm 50, the gears 70, 71, the shafts 72 and 73 and the gears 74 and 75. Since the adjusting worm 60 is threaded in the nuts 57 and 59 secured to the beams 56 and 58 and is held against axial movement by its fixed bearings 60a, the rotation of the adjusting worm 60 causes the beams to move transversely.

It is desirable to make the adjustments in the positions of the rocker shafts 30 and 32 while the magnet arms 12 and 16 are substantially horizontal and to prevent these arms from turning during adjustments. For that purpose, there is provided a pair of solenoid-controlled air cylinders 80 and 81 mounted on the beams 56 and 58 for movement therewith and having respective piston rods adapted to be projected into holes 82 and 83 in the worm wheels 53 and 55 secured to the rocker shafts 30 and 32 respectively. When linear movements of the rocker shafts 30 and 32 for adjustments in the spacing of the magnet arms 12 and 16 are desired, a switch (not shown) is operated to energize the solenoids controlling the air cylinders 80 and 81, whereby the necessary air valves are operated to project the piston rods outwardly under the action of air pressure. When the holes 82 and 83 in the worm wheels 53 and 55 are in position opposite these piston rods, these piston rods project into these holes and lock the worm wheels against rotation, with the magnet arms 12 and 16 substantially horizontal. Individual joggle push buttons (not shown) energize clutches 43 and 44. With the clutch 76 energized to couple the shafts 72 and 73 and to establish thereby drive connection from the worm 50 to the worm 60, the manipulation of the joggle push buttons causes the rocker shafts 30 and 32 to move laterally for adjustments in the positions of the magnet arms 12 and 16. Limit switches (not shown) controlling the energization and deenergization of the clutches 43 and 44, prevent the rocker shafts 30 and 32 from moving linearly beyond predetermined limits both ways.

When the necessary adjustments in the spacing between the magnet arms 12 and 16 have been made, the solenoids in the air cylinders 80 and 81 are deenergized to withdraw their piston rods by air pressure from the worm wheels 53 and 55, the clutch 76 is disengaged and the brake 77 is applied, to disconnect the drive to the adjusting worm 60 and to permit turnover operations in the manner described.

The magnet arms 12 and 16 are similar in construction, except that the magnet arms 16 are magnetically stronger than the magnet arms 12 to draw the containers 10 away from the magnet arms 12, as the arms are returned from substantially vertical position towards substantially horizontal position. To simplify explanation, only the magnet arms 12 will be described.

Each magnet arm 12 in substantially horizontal position is located below a corresponding pair of feed belts 11 and extends therealong below the space 11a therebetween to permit the arm to move angularly up and down through said space. In the specific form shown, each magnet arm 12 comprises a hub 90 (FIGS. 6, 7 and 8) keyed or otherwise rigidly secured to the rocker shaft 30 and rigidly carrying a flat support bar 91 reinforced by a web 92. Supported on and extending along the support bar 91 is a cover comprising two flat parallel bars 93 of magnetizable material, such as iron. Secured to the cover bars 93 are a series of permanent magnets 94, four being shown spaced along said bars to magnetize said cover bars, and thereby to magnetically take hold of the container 10 at the proper time.

To permit the magnet arm 12 to strike the underside of the container 10 with minimum of shock, the cover bars 93 are yieldably supported on the support bar 91. For that purpose, there are provided a plurality of spaced support blocks 95, two being shown, secured to the support bar 91, as for example, by studs 96, and each confined between upstanding flanges 97 rigidly secured to the support bar 91, as for example, by welding. Each block 95 is formed with an annular recess 98 to receive a coil spring 100 and to form a post 101. A connecting plate 102 extends between and is rigidly secured to the two cover bars 93 and a bolt 102a mounted on the post 101 and passing freely through said connecting plate serves as a guide for the connecting plate and as a means for limiting the outward movement of the cover bars 93 and the connecting plate 102 relative to the support bar 91 under the action of the coil spring 100. The upper end of the block 95 serves as a seat to limit the inward movement of the cover bars 93. The cover bars 93 are thereby spring-pressed and engage the underside of the container 10 at the proper time with a minimum of shock, without interfering with the magnetic attracting force of the cover bars 93 created by the permanent magnets 94.

The magnet arms 16 are similar in construction to the arms 12 and are similarly located in relation to the delivery belts 15, the only difference being that each of the magnet arms 16 carries six permanent magnets 94 instead of four as in the magnet arms 12, to attract the containers 10 with greater magnetic power. These magnets 94 on the arms 16 are resiliently supported as in the case of the magnet arms 12.

As the containers 10 of each row arrive at the turnover station, they are stopped for the purpose of centering each of said containers in relation to the corresponding supporting feed belt 11, and for the purpose of aligning the containers at the turnover station in the row, before the magnet arms 12 and 16 start their turnover cycle. For that purpose, each the magnet arms 12 carries a pair of stop pins 110, supported in slide bearings 111 affixed to the opposite sides of a channel piece 109 and adapted to project through the space 11a between the corresponding pair of feed belts 11 and above the supporting surface of said belts in the path of the containers, when the machine has been switched to turnover operations. When the machine is set to operate without turnover operation, the stop pins 110 are withdrawn below the supporting surfaces of the feed belts 11.

To permit the stop pins 110 to be rendered selectively operative or inoperative, the pins are urged towards inoperative position by coil springs 112 encircling the shanks of the pins respectively and bearing at the ends against the undersides of the bearings 111 and against washers 113 supported on said pins by cotters.

These stop pins 110 are spring-pressed against respective cams 114 secured to a rocker cam shaft 115 journalled in bearings 116 affixed to a plate 108 rigidly secured to the beam 56. The rocker cam shaft 115 extends across the machine and carries pairs of cams 114 corresponding in number to the number of containers 10 adapted to be transported in each row. A solenoid-controlled air cylinder 117 (FIGS. 1A, 2, 3A, 4) supported on the plate 108 rocks the cam shaft 115 through a linkage 118 and is operated to turn all of the pairs of cams 114 selectively either in position in which the stop pins 110 on all of the magnet arms 12 are depressed below the supporting surfaces of the feed belts 11 through the action of the springs 112 or are elevated as shown in FIGS. 6 and 7, so that said pins project above the supporting surfaces of the feed belts and in the path of the containers 10, to stop the containers and at the same time center them in relation to their supporting belts, while said belts continue to operate.

After the containers 10 are aligned in a row by the stop pins 110 and are properly centered with respect to their supporting feed belts 11, the magnet arms 12 are moved in position to engage the undersides of the containers and start tilting them over. As the containers 10 are raised by the magnet arms 12 above the feed belts 11, the stop pins 110 move away from the cams 114, so that the pins are permitted under the action of the coil springs 112 to slide along their bearings 111. It is desirable not to withdraw the stop pins 110 beyond the bottom sides of the containers 10, so that as said containers are tilted towards horizontal position, these stop pins serve as a means for preventing the containers from sliding off the magnet arms 12, in case said arms should not be magnetically strong enough to prevent such container sliding action. For that purpose, the pins 110 have shoulders 119, which limit the extent of inward movement of the pins, so that they do not lose support contact with the forward side of the container during upward angular movement of the magnet arm 12. The turn over of the containers from vertical position to horizontal position is thereby attended smoothly without slippage of the containers along the magnet arms 12.

Because of the heavy eccentric leverage on the shaft 30 resulting from the support of the magnet arms 12 thereon, this leverage is counterbalanced by a pair of weights 120 supported on said shaft. Similarly, the loading of the shaft 32 by the magnet arms 16 is counterbalanced by a pair of weights 121 supported on said shaft.

Although the operation of the machine is believed to be apparent from the foregoing description, it is briefly summarized herein.

The motors 40 and 41 are wired in series with the solenoid control of the air cylinder 117. When the turnover is in use, the control circuit energizes both motors 40 and 41 and advances the piston of the air cylinder 117, thereby rotating the cams 114 and lifting up the stop pins 110 into position to stop the row of containers 10, as these containers arrive at the turnover station and to center these containers in relation to the feed belts 11, while the feed belts continue to operate.

A transfer mechanism (not shown) assembles and transfers the containers 10 coming in single file from a previous operation to the feed belts 11 in successive rows. As a row of containers 10 reaches the turnover station and is stopped by the stop pins 110, a transfer beam (not shown) transferring the next row of containers to the feed belts 11, trips a limit switch (not shown) and causes the clutch 43 to be energized and engaged and the drive worm 50 to be driven from the motor 40 in a direction to cause the magnet arms 12 and 16 to move angularly upwardly. The magnet arms 12 move into engagement with the lower ends of the containers 10 and seize them by magnet power, causing the containers to be turned on their sides across the transition zone between the feed belts 11 and the delivery belts 15, as the magnet arms reach vertical position. At the same time, the magnet arms 16 also move into vertical position to engage the other ends of the containers. At that instant, the tripping of a limit switch (not shown) deenergizes the clutch 43, applies the brake 45 to prevent overrun of the magnet arms 12 and 16, then disengages the brake and energizes the clutch 44 to cause the drive worm 50 to be driven from the motor 41 in a direction to lower angularly the magnet arms 12 and 16. Since the magnet arms 16 attract their ends of the containers 10 with a force greater than that with which the magnet arms 12 attract their ends of the containers, the magnet arms 16 pull the containers away from the magnet arms 12 and lift up the containers into upright position, as said magnet arms 12 and 16 move towards horizontal position. As the magnet arms 16 move below the delivery belts 15, they draw away from the containers 10, which are now in upright position, and these containers are carried away by the delivery belts to the drying oven or some other point.

The return movements of the magnet arms 12 and 16 towards horizontal position takes place at twice the rate of movement of the magnet arms towards vertical position, and when said magnet arms have completed their return movement, a limit switch (not shown) is tripped, causing the disengagement of the clutch 44, the application of the brake 45 to prevent overrun, and the immediate disengagement of said brake. The cycle is then repeated when the limit switch (not shown) is tripped by the transfer beam (not shown) as described above.

While the invention has been described with particular reference to a specific embodiment, it is to be understood that it is not to be limited thereto but is to be construed broadly and restricted solely by the scope of the appended claims.

What is claimed is:

1. A machine for turning over articles at a station, comprising means for conveying the articles in succession along a substantially horizontal course into and past said station, a pair of magnet arms supported for angular movements and spaced along said conveying means, means for angularly moving the first of said magnet arms cyclically from initial position below said course into position to engage and magnetically hold onto the bottom end of each article seated on said conveying means, then into upstanding position to turn the article partially on its side, and then back again into said initial position, and means for angularly moving the second of said magnet arms cyclically from initial position below said course towards upstanding position to engage and magnetically hold onto the other end of the partially turned article and then back towards initial position to continue the turning of the article until the latter end of the article is on the bottom seated on said conveying means.

2. A machine for turning over the articles at a station as described in claim 1, wherein said magnet arms move cyclically in unison in opposite directions to bring said arms into upstanding positions substantially at the same time, and wherein said magnet arms are spaced to cause said arms when in upstanding positions to be in engagement with the opposite ends of each article, and wherein the second magnet arm attracts said other end of each article with magnet force greater than that with which the first magnet attracts said bottom end of each article, to cause said second magnet to pull the article away from said first magnet arm, as said magnet arms return in opposite directions towards said initial positions.

3. A machine for turning over articles at a station as described in claim 2, comprising means for adjusting the distance between the magnet arms to adjust thereby the distances between said arms in upstanding positions to accommodate articles of different length between their ends.

4. A machine for turning over articles at a station, comprising means for conveying the articles in succession to and along said station, and means for turning over the articles in succession on said conveying means as the articles reach said station, and comprising a magnet arm including a frame structure, cover bar means, spring means resiliently supporting said cover bar means on said frame structure, permanent magnet means connected to said cover bar means for magnetizing said cover bar means, and means for cyclically moving said frame structure to move said cover bar means from an initial inoperative position into position to engage and seize the articles and then into position to turn over the seized articles, the resilient support for said cover bar means reducing the shock of impact with the articles.

5. A machine for turning over articles at a station comprising means for conveying the articles in succession to and along said station, means for turning over the articles in succession on said conveying means as the articles reach said station, comprising a pair of magnet arms at said station spaced along said station, a pair of parallel rocker shafts to which said magnet arms are connected respectively, worm wheels secured to said shafts respectively, a worm having two thread sections spaced therealong meshing with said worm wheels respectively and adapted to rotate said worm wheels simultaneously in opposite directions, whereby said magnet arms move simultaneously in opposite directions, and means for driving said worm cyclically first in one direction and then in the opposite direction, one of said magnet arms being located to move from an initial position to successive positions to seize the lower end of each article to turn the seized article on its side and to return it to said initial position for one turnover cycle, and the other magnet arm being located to move from an initial position to successive positions to seize the other end of each article turned on its side, and to return to the latter initial position to complete the turnover of the article.

References Cited in the file of this patent
UNITED STATES PATENTS

| | | |
|---|---|---|
| 1,828,909 | Peterson | Oct. 27, 1931 |
| 2,527,024 | Mitchell | Oct. 24, 1950 |
| 2,750,659 | Sassi | June 19, 1956 |
| 2,851,147 | Hageline | Sept. 9, 1958 |
| 2,954,863 | Staples | Oct. 4, 1960 |